Nov. 10, 1959     W. E. STEEN     2,911,955
FLUID METER

Filed Sept. 18, 1957     2 Sheets-Sheet 1

INVENTOR.
WILLIAM E. STEEN
BY
Andrus, Sceales & Starke
ATTORNEYS

Nov. 10, 1959   W. E. STEEN   2,911,955
FLUID METER
Filed Sept. 18, 1957   2 Sheets-Sheet 2
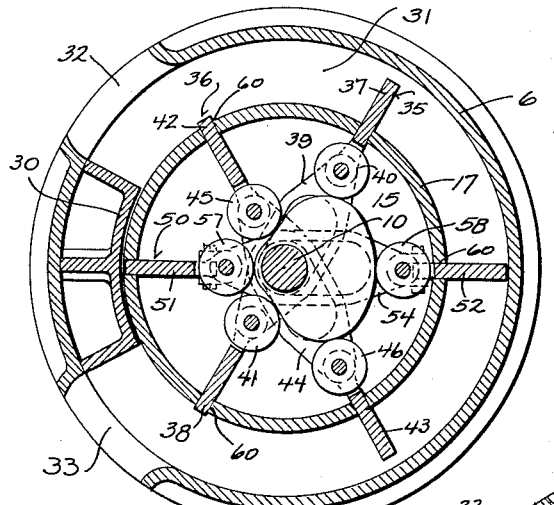
Fig. 2
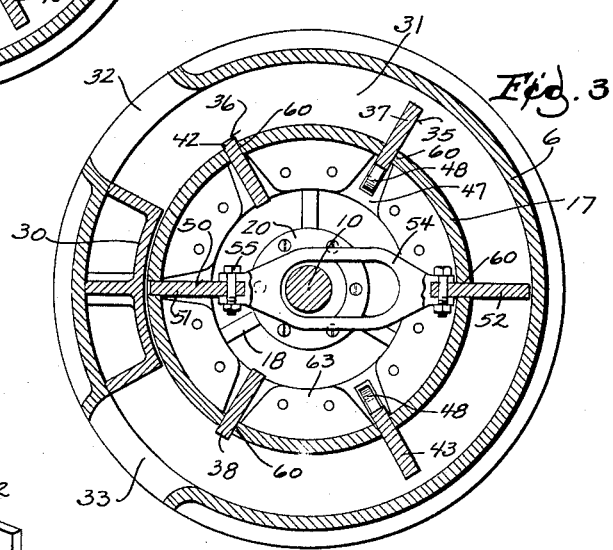
Fig. 3
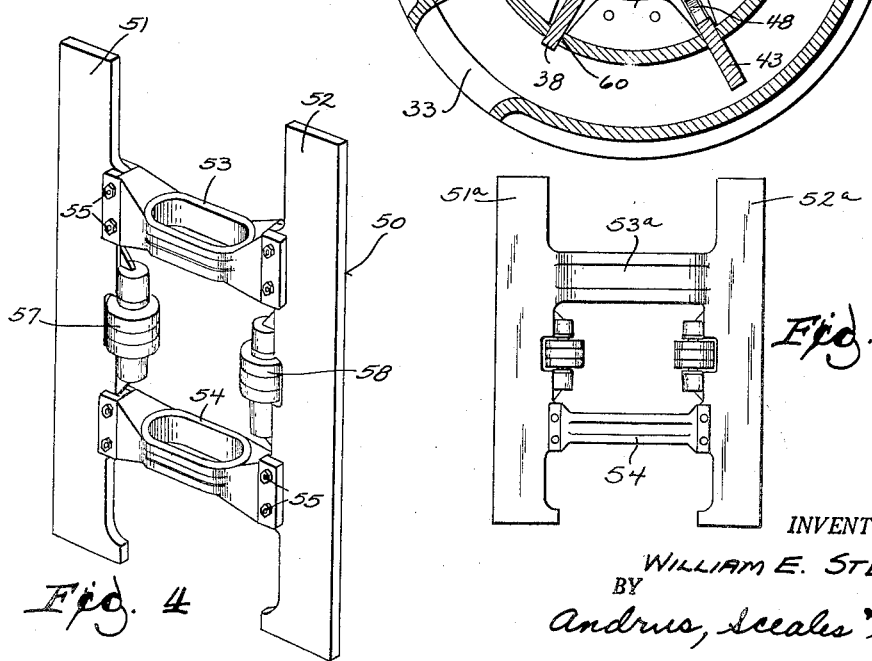
Fig. 4
Fig. 5
INVENTOR.
WILLIAM E. STEEN
BY
Andrus, Sceales & Starke
ATTORNEYS 2,911,955
FLUID METER William E. Steen, South Pasadena, Calif., assignor to A. O. Smith Corporation, Milwaukee, Wis., a corporation of New York Application September 18, 1957, Serial No. 684,672

7 Claims. (Cl. 121—90)

This invention relates to fluid meters of the type in which the rotor rotates about a central shaft and a plurality of pairs of blades are actuated by a stationary cam to cause each pair of blades to shuttle transversely of the flow channel due to rotor rotation as set up by the flow of fluid.

The present invention is in the nature of an improvement over the meter shown in my U.S. Patent Number 2,296,542, issued September 22, 1942, and entitled, "Spindle Packing For Meters And The Like." In that patent the opposite blades of any pair of blades are connected together by a Scotch-yoke type of construction which encircles the fixed central shaft. Each pair of blades is shuttled back and forth across the flow path of the fluid under the action of a single fixed cam. The device of said patent uses only two pairs of blades, or four individual blades which are spaced 90 degrees apart. Thus the measuring chamber, or the space between two extended blades, of such a meter is a 90 degree arc. With this conventional arrangement any blade must be shuttled between fully extended and retracted positions in slightly less than 90 degrees of rotor revolution. This shuttling of the blade occurs twice during each revolution of the rotor and it is this particular highly accelerative and decelerative movement that has heretofor limited both the speed and capacity of such meters.

In accordance with the present invention, novel means have been provided for mounting an additional pair of blades in a device of the above type, all blades still being capable of actuation by a single cam, and by means of which assembly and disassembly of the meter is not only possible, but practical.

Accordingly, with the use of six blades, the measuring chamber of a meter of the present invention is an arc of only 60 degrees. However, the blade is now moved from one extremity of its stroke to the other through almost 120 degrees of rotor rotation. As a result the additional time permitted for the blade to shuttle across the flow path has substantially reduced the load imposed on the cam and blade rollers, resulting in longer meter life, greater meter accuracy and a quieter and more smoothly operating unit. In commercial use, an increased capacity on the order of 30 percent for a given size meter has been realized.

The use of a number of blades greater than four is conventional in fluid meters in general, but in this particular type of meter, in which the diametrically opposed blades are physically connected and are all operated by a common means, the space limitations within the housing and the difficulties of assembly and disassembly of the unit has heretofor prevented successful utilization of six such blades. The construction and mounting of the third pair of blades of this invention is such as to overcome these difficulties and permit the ready assembly of the third blade assembly in non-interfering position with respect to the other blades and so that all blades are operated by a single cam.

These and other objects and advantages will appear hereinafter as this disclosure progresses, reference being had to the accompanying drawings in which:

Figure 2 is a transverse elevational view, in section, taken on the line 2—2 in Figure 1;

Figure 3 is a transverse elevational view, in section, taken on the line 3—3 in Figure 1;

Figure 4 is a perspective view, on a reduced scale, of the third pair of blades made in accordance with this invention; and Figure 5 is an elevational view, on a further reduced scale, of a modification of the third blade assembly.

Figure 1:
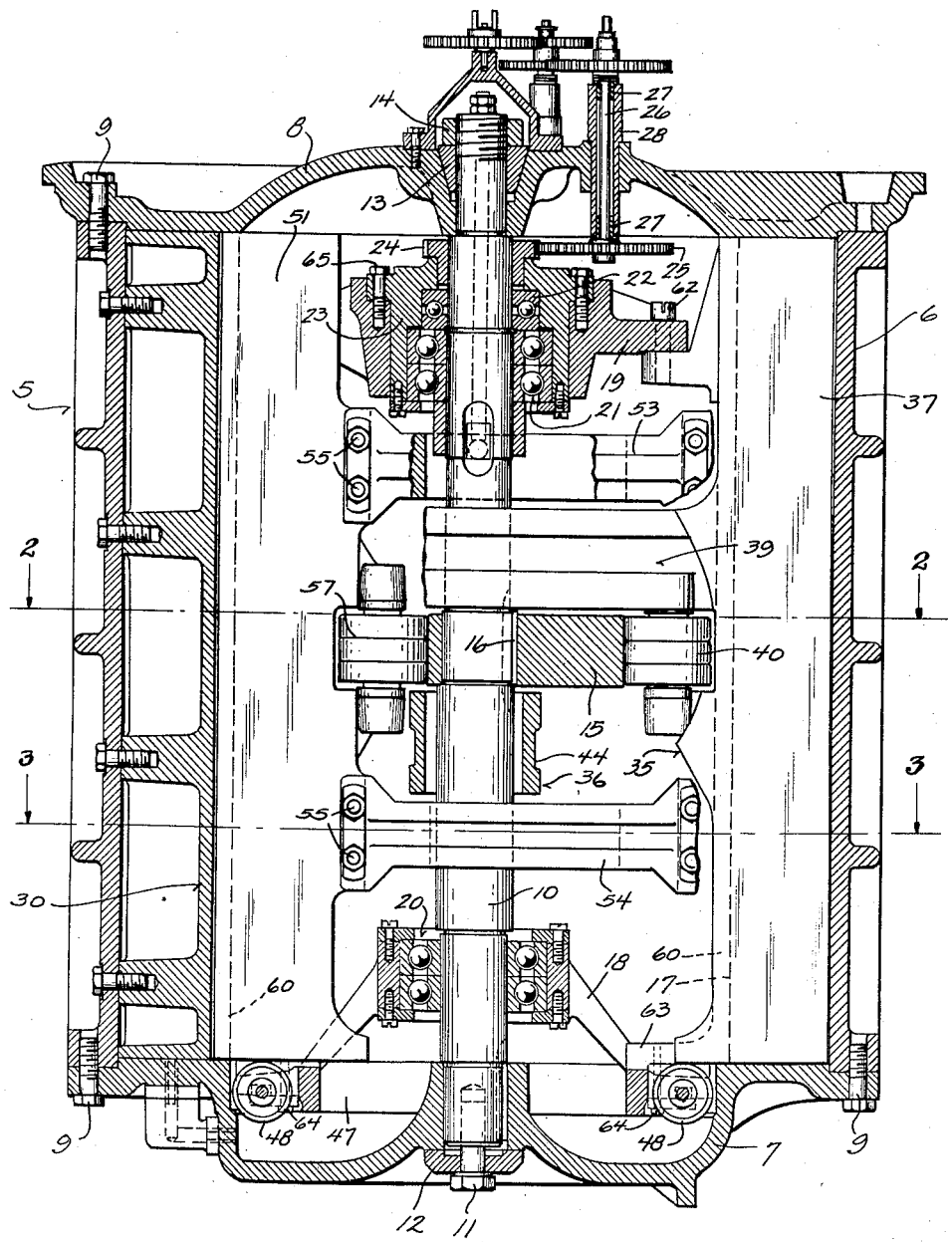
Figure 1 is an axial cross-sectional view of a meter made in accordance with the present invention, certain parts being broken away for clarity of the drawings.

Referring more particularly to the drawings, the meter includes a housing 5 comprising a cylindrical barrel 6, bottom plate 7, and top plate 8, all detachably secured together by cap bolts 9.

A shaft 10 is fixedly mounted within the housing by means of cap bolt 11 and cap 12 at one end and by the wedge member 13 and nut 14 threadably engaged on the other end of the shaft.

A stationary cam 15 is fixed to the shaft 10 by the key 16.

A rotor 17 is mounted for rotation about shaft 10 by means of the lower end spider 18 and upper plate 19. The lower end spider 18 is mounted on the anti-friction double radial bearing assembly 20. The upper plate 19 is mounted on the double anti-friction radial bearing assembly 21 and also on the rotor thrust bearing 22.

The drive connection between the rotor and the registering mechanism (not shown) includes a pinion 24 on the rotor meshing with a gear 25 on shaft 26, the latter extending vertically through the packing 27 in tube 28 mounted in top plate 8. As this drive connection forms no part of the present invention, further comments concerning it are deemed unnecessary.

An arcuate abutment 30 is secured within barrel 6 and projects across the flow channel 31 to separate the outlet 32 and inlet 33 thereof. The blades, to be described, and cam are so constructed that each blade is radially retracted as it passes the abutment, as will appear hereinafter.

Two of the blade assemblies 35 and 36 are similar in construction. Assembly 35 comprises diametrically opposed blades 37, 38 connected together by the integral central connecting member in the form of the yoke 39. A pair of diametrically opposed rollers 40, 41 are rotatably mounted on the blade assembly adjacent this central yoke and ride on the peripheral surface of the cam 15. Assembly 36 comprises the opposed blades 42, 43 which are connected together by the integral central connecting member or yoke 44. A pair of opposed rollers 45, 46 of this pair of blades also rides on cam 15.

The spider 18 is formed integrally with an end ring portion 47 thus forming the lower rotor cover. The ring 47 carries a plurality of anti-friction rollers 48. These rollers 48 are engaged by the lower ends of the blades for supporting the latter and insure free radial movement of the blades.

The third assembly 50 of blades comprises blades 51, 52 which are detachably joined together by a pair of axially spaced connecting members in the form of yokes 53, 54 detachably fastened thereto by bolt means 55. It will be noted that these yokes 53, 54 straddle the yokes 39, 44, that is, they are located one on each side of the yokes 39, 44. Rollers 57, 58 are rotatably mounted on the inner central portion of the blades 51, 52, respectively, and ride on cam 15.

The rotor 17 has six evenly spaced axial extending slots 60 which control the circumferential position of the three blade assemblies, maintaining the individual blades 60 degrees apart.

As the liquid flows through the meter, the rotor and blades revolve around the fixed cam. The anti-friction rollers fixed to the blades roll around the cam, causing the blades to move radially. The successive movement of the blades outwardly toward the housing wall, forms a measuring chamber of precise volume between the blades, the rotor, the housing wall, the top cover and the bottom cover. A continuous series of these closed chambers is produced, six for each revolution of the rotor.

By the use of six blades instead of four, a blade is now moved from one end of its stroke to the other through almost 120 degrees of rotor rotation. The additional time allowed for shuttling the blade reduces the load on the cam and blade rollers considerably, providing a smoothly operating meter.

The flow of liquid is literally undisturbed while it is being metered. Since energy is not wasted in arresting liquid velocity, slippage is reduced to a minimum, resulting in greater accuracy. Low pressure drops due to the streamlined flow and absence of friction results in freedom from wear and long life, thus assuring sustained accuracy.

With the double yoke construction of the third blade assembly, wherein the blades are detachable from the yokes, this third pair of blades can be assembled in the rotor after the other two blade assemblies 35 and 36 are in place. More specifically, with the rotor removed from the housing, assemblies 35 and 36, each having only one yoke, can be slipped over the upper end, of the central shaft so their rollers engage the adjacent cam. The yokes 39 and 44 take up the space on either side adjacent the cam, and to insure a properly balanced third pair of blades, two axial spaced yokes 53, 54 are required because of the lack of space adjacent the central portion of this third pair of blades for a single yoke.

In order to permit assembly of a blade unit having a yoke on either end, the yokes are made detachable from the blades.

For the assembly operation, the rotor lower cover comprising members 18 and 47, are placed on a suitable assembly block having a hole to clear the central shaft 10. The blade assembly 36 is placed in position on the rotor lower cover. Then only the lower yoke 54 of the assembly 50 is placed in position on the lower cover. At this time the bottom end of the cam shaft 10 is passed downwardly through yoke 44 and yoke 54 and into the rotor cover bearing assembly 20. Blade assembly 35 is then placed into position on the rotor lower cover with its yoke 39 above the cam. The third pair of blades 51 and 52 have previously been secured to their upper yoke 53 and this unit is then placed in position. The lower yoke 54 is now attached to the blades 51 and 52. As shown in Figure 5, it would be within the scope of this invention to make the blades 51a, 52a and one of the yokes 53a, 54 integral therewith, and provide for detachably securing only one of the yokes to these blades. However, to insure good balance of the blade assembly and because of manufacturing reasons, particularly in forming the slots in the yokes, the assembly has been made as illustrated. With the cam shaft and all three pairs of blades in position on the rotor lower cover, the rotor 17 with its upper plate 19 already attached by cap bolts 62 is carefully lowered over the blades and shaft, starting the blades in their respective slots 60, one at a time. When the flange 63 at the bottom of the rotor 17 contacts the rotor lower cover, the lower cover is bolted by bolt means 64 to the rotor flange 63. The bearing cap assembly 23, containing bearings 21 and 22, is then bolted into place by bolts 65.

Various modes of carrying out the invention are contemplated as being within the scope of the following claims particularly pointing out and distinctly claiming the subject matter which is regarded as the invention.

I claim:

1. In a fluid meter of the type having a housing, a central shaft mounted within said housing, a fixed cam mounted centrally on said shaft, a rotatable rotor mounted on said shaft so as to define a path of fluid flow between said housing and said rotor, and a pair of blade assemblies mounted in said rotor and each having a roller adapted to ride on said cam to cause radial movement of said assemblies as the latter rotate, said assemblies each having a pair of diametrically opposed blades joined together by a connecting member; the improvement comprising, a third blade assembly mounted in said rotor and having a roller adapted to ride on said cam, said third assembly including two diametrically opposed blades connected together by a pair of axially spaced connecting members, at least one of which is detachably secured thereto.

2. In a fluid meter of the type having a housing, a central shaft mounted within said housing, a fixed cam mounted centrally on said shaft, a rotor rotatably mounted on said shaft so as to define a path of fluid flow between said housing and said rotor, and a pair of blade assemblies mounted in said rotor and each having a roller adapted to ride on said cam to cause radial movement of said assemblies as the latter rotate, said assemblies each having a pair of blades joined together by a connecting member, one of said connecting members being disposed axially to one side of said cam and the other connecting member being disposed axially on the other side of said cam; the improvement comprising a third blade assembly mounted in said rotor and having a roller adapted to ride on said cam, said third assembly including two diametrically opposed blades, and a pair of axially spaced connecting members, at least one of which detachably securing said third assembly blades together.

3. In a fluid meter of the type having a housing, a non-rotatable central shaft mounted within said housing, a fixed cam mounted centrally on said shaft, a rotor mounted for rotation on said shaft so as to define a path of fluid flow between said housing and said rotor, and a pair of blade assemblies mounted in said rotor and each having a pair of diametrically opposed rollers adapted to ride on said cam to cause radial movement of said assemblies as the latter rotate, said assemblies each having a pair of diametrically opposed blades joined together by a connecting member, one of said connecting members being disposed axially to one side of said cam and the other connecting member being disposed axially on the other side of said cam; the improvement comprising a third blade assembly mounted in said rotor and having a pair of diametrically opposed central rollers adapted to ride on said cam, said third assembly including two diametrically opposed blades connected together by a pair of axially spaced connecting members detachably secured thereto.

4. In a fluid meter of the type having a housing, a non-rotatable central shaft mounted within said housing, a fixed cam mounted centrally on said shaft, a rotor mounted for rotation on said shaft so as to define a path of fluid flow between said housing and said rotor, and a pair of blade assemblies mounted in said rotor and each having a pair of diametrically opposed rollers adapted to ride on said cam to cause radial movement of said assemblies as the latter rotate, said assemblies each having a pair of diametrically opposed blades joined together by a yoke, one of said yokes being disposed axially to one side of said cam and the other yoke being disposed axially on the other side of said cam; the improvement comprising a third blade assembly mounted in said rotor and having a pair of diametrically opposed central rollers adapted to ride on said cam, said third assembly including two diametrically opposed blades connected together by a pair of axially spaced yokes detachably secured thereto, said yokes having an open central portion so as to receive said shaft therein.

5. In a fluid meter of the type having a housing, a central shaft mounted within said housing, a fixed cam mounted centrally on said shaft, a rotatable rotor mounted on said shaft so as to define a path of fluid flow between said housing and said rotor, and a pair of blade assemblies mounted in said rotor and each having a roller adapted to ride on said cam to cause radial movement of said assemblies as the latter rotate, said assemblies each having a pair of blades joined together by a yoke, one of said yokes being disposed axially to one side of said cam and the other yoke being disposed axially on the other side of said cam; the improvement comprising a third blade assembly mounted in said rotor and having a central roller adapted to ride on said cam, said third assembly including two diametrically opposed blades, and a pair of axially spaced yokes detachably securing said third assembly blades together and located on opposite sides of said first two yokes, said blades all adapted to move radially across said path and spaced 60 degrees apart.

6. A rotary fluid meter comprising in combination, a housing, a central shaft mounted within said housing, a fixed cam mounted centrally on said shaft, a rotor mounted on said shaft so as to define a path of fluid flow between said housing and said rotor, a pair of blade assemblies mounted in said rotor and each having a roller adapted to ride on said cam to cause radial movement of said assemblies as the latter rotate, said assemblies each having a pair of blades joined together by a connecting member, one of said connecting members being disposed axially to one side of said cam and the other connecting member being disposed axially on the other side of said cam, and a third blade assembly mounted in said rotor and having a roller adapted to ride on said cam, said third assembly including two diametrically opposed blades and a pair of axially spaced connecting members detachably securing said third assembly blades together.

7. A rotary fluid meter comprising in combination, a housing, a central shaft mounted within said housing, a fixed cam mounted centrally on said shaft, a rotor mounted on said shaft so as to define a path of fluid flow between said housing and said rotor, a pair of blade assemblies mounted in said rotor and each having a roller adapted to ride on said cam to cause radial movement of said assemblies as the latter rotate, said assemblies each having a pair of blades joined together by a yoke, one of said yokes being disposed axially to one side of said cam and the other yoke being disposed axially on the other side of said cam, and a third blade assembly mounted in said rotor and having a roller adapted to ride on said cam, said third assembly including two diametrically opposed blades and a pair of axially spaced yokes detachably securing said third assembly blades together, said yokes all having an open central portion through which said shaft passes.

References Cited in the file of this patent

UNITED STATES PATENTS

| | | |
|---|---|---|
| 729,399 | Palle | May 26, 1903 |
| 1,259,749 | Jorgenson | Mar. 19, 1918 |